United States Patent [19]

Sobey

[11] Patent Number: 5,856,986
[45] Date of Patent: Jan. 5, 1999

[54] SYNCHRONIZATION FIELD PATTERN SELECTION

[75] Inventor: Charles H. Sobey, Plano, Tex.

[73] Assignee: Texas Instruments Incorporated, Dallas, Tex.

[21] Appl. No.: 756,221

[22] Filed: Nov. 25, 1996

[51] Int. Cl.[6] .................................................. G01R 31/28
[52] U.S. Cl. ...................... 371/27.7; 371/37.03
[58] Field of Search ........................ 371/27.7, 37.01, 371/37.7, 40.15, 41, 37.03, 43.7, 40.2, 40.12, 37.07, 43.6; 360/49–51, 77.08, 78.08; 395/183.18, 185.05

[56] References Cited

U.S. PATENT DOCUMENTS

| 4,825,403 | 4/1989 | Gershenson et al. | 364/900 |
| 5,253,131 | 10/1993 | Chevalier | 360/78.14 |
| 5,289,476 | 2/1994 | Johnson et al. | 371/37.1 |
| 5,384,671 | 1/1995 | Fisher | 360/51 |
| 5,420,730 | 5/1995 | Moon et al. | 360/77.08 |
| 5,442,498 | 8/1995 | Cheung et al. | 360/77.08 |
| 5,442,499 | 8/1995 | Emori | 360/77.08 |
| 5,444,685 | 8/1995 | Masood et al. | 369/47 |
| 5,448,571 | 9/1995 | Hong et al. | 370/105.4 |
| 5,636,229 | 6/1997 | Eerenstein et al. | 371/27 |

*Primary Examiner*—Robert W. Beausoliel, Jr.
*Assistant Examiner*—Nadeem Iqbal
*Attorney, Agent, or Firm*—Bret J. Petersen; W. Daniel Swayze, Jr.; Richard L. Donaldson

[57] ABSTRACT

A detection device for detecting a pattern and determining valid patterns by a series of tests. These tests include rejecting patterns based on minimum Hamming distance, spectral energies that are not concentrated with a predetermined ideal spectrum, that are not valid predetermined valid codewords, patterns that are not anti-symmetric and that have closest transition spacing.

9 Claims, 13 Drawing Sheets

THREE 3-BIT BLOCKS

SIX 3-BIT BLOCKS

SYNC PATTERN – 000010110

SYNC PATTERN – 000011010

SYNC PATTERN – 000100101

SYNC PATTERN – 000101001

SYNC PATTERN – 000101101

SYNC PATTERN – 000110010

SYNC PATTERN – 010000110

SYNCHRONIZATION FIELD PATTERN SELECTION

FIELD OF THE INVENTION

The present invention relates to a pattern detection, and more particularly, to pattern detection of a pattern on a magnetic surface.

BACKGROUND OF THE INVENTION

Once data has been written on a disk it is usually necessary to read that data at a later time. When this data has been written on a recording medium, for example, a hard disk drive, it is often necessary to correctly and accurately detect where this information is located. In part, this is accomplished by specifying the track number as part of the servo information. The track number alone is insufficient to completely specify the exact location of the data. In order to more closely identify the location of the data, additional servo information, which provides track center location information, is recorded on the surface of the recording medium.

FIG. 2 illustrates a portion of data sector 100 that has previously been recorded on a recording medium, for example, a hard disk drive. The data sector may include a synchronization field (sync field) 110 and a preamble 120 and user information or sector ID information 105. The synchronization field 110 may immediately follow the preamble 120 at the beginning of each data sector on a recording medium. The preamble 120 may be written with a $1/4T_s$ squarewave of write current, where $T_s$ is the sample period. The preamble 120 may be read back as a high SNR sine wave, with inter-symbol interference (ISI), with phase-locked loop (PLL) and automatic gain control (AGC) circuitry to be used for timing and gain acquisition, respectively. The synchronization field 110, or sync field, indicates the beginning of the data for example, the user data or sector ID information.

The sync field pattern in the sync field 110 may be selected to minimize the probabilities of false alarm (false detection) of the sync field pattern and missed detection of the sync field pattern for the particular architecture of the sync field detector. For a given architecture, these probabilities may be determined by an operating bit error rate (BER) in the region around the sync field, the threshold of the number of comparison errors which will be accepted, and the Hamming distance of the sync field pattern from the preamble, from the sync field pattern itself and from data.

Sector Header Layout

FIG. 1 illustrates the layout of a typical sector as servo information 110 followed by a data sector 120. The data sector may include a data field 130 and an ID field 140. User data may be split across servo sectors. The components of the servo information may include a servo preamble which provides a pattern for PLL and/or AGC acquisition. The address mark follows the preamble. Peak detection circuitry determines the address mark, which functions like the sync field to indicate that the track number is to be read. Four servo bursts (additional or fewer servo bursts may be present) are evaluated and provide for calculating track position adjustments. This implies that during the header sections shown in FIG. 1, which may include preamble and sync field, the reading element may still be settling on track. The head's position off of the track's centerline will reduce the effective SNR and hence increase the BER in these fields.

The data field 130 of the data sector is shown in FIG. 2. The data preamble pattern may be shown as element 135, for example, a $1/4T_s$ write current waveform, where $T_s$ is the sampling period of the pattern. This pattern, when read, provides a signal similar to a sinusoid with good SNR and well controlled ISI. The pattern may be used for PLL and/or AGC acquisition. The preamble may be up to 15 bytes long with each byte that may be 9 bits, although 8-bit bytes may be used. This preamble is followed by the sync field 137 typically consisting of fewer bits than the preamble, for example 18 bits long. Following the sync field there may be the user data plus Error Correction Coding (ECC) 139 which may include, for example 512K user bytes. These bits are constrained typically by the requirements of RLL (Run-Length Limited) encoding, for example 8/9 (0,4,4).

DETAILED DESCRIPTION OF THE INVENTION

Figure 1:
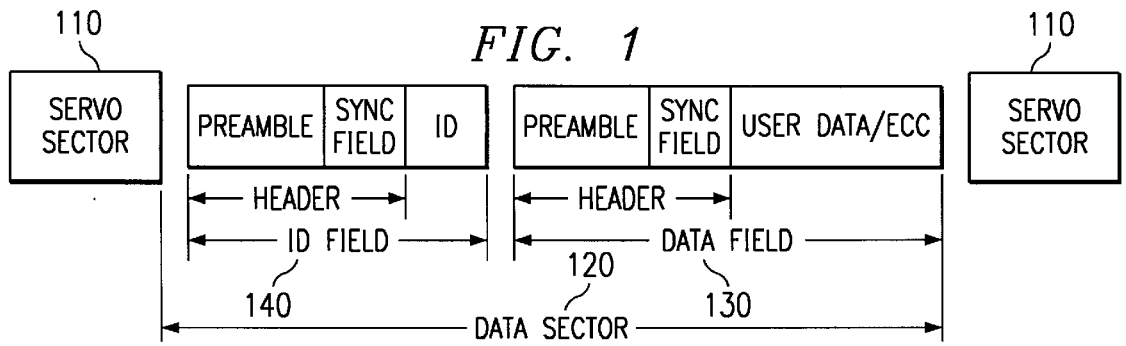
FIG. 1 illustrates a portion of a typical track including servo sectors and data sector.
Figure 2:
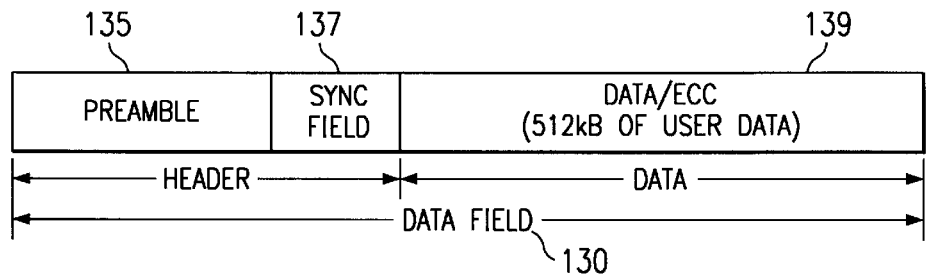
FIG. 2 illustrates the data field of a typical data sector.
Figure 3A:
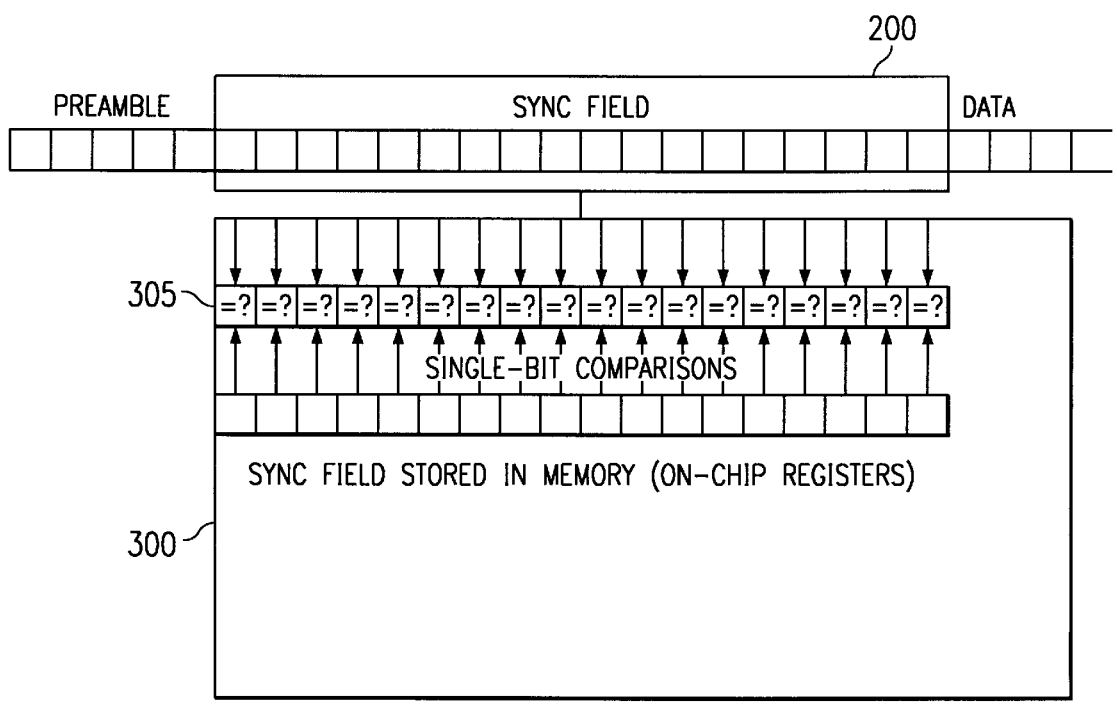
FIG. 3a illustrates a 18-bit, single-bit comparison sync field detector architecture.

A detection device 300 reads and compares the read pattern to identify the sync field. The 18-bit sync field may be detected by 18 consecutive single-bit comparators. Although other detection devices may be employed, FIG. 3 shows elements for a detection device 300. This detection device may include a memory 320 to store the sync field pattern, the 18 single-bit comparators 305, a decision metric circuit or CPU 310 and a time-out circuit 340.

Figure 3B:
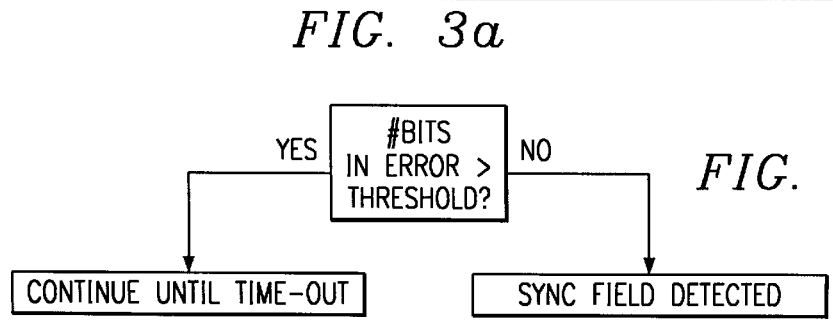
FIG. 3b illustrates the operation of the detector.

When a signal to begin searching for the sync field pattern is received by the detection device 300, the first block of 18 bits as read by the read head 200 is compared to the sync field pattern which is permanently or temporarily stored in some form on chip. The number of bit errors from this comparison are summed and the result is compared to a threshold, T, of maximum acceptable bit errors. That is, if less than T bits are in error, the current sequence of bits is accepted as the sync field pattern. This condition implies that the very next bit in the sequence (for example, the "19th bit" in this example) is the beginning of the ID information in the ID field, or the data in the data field. If more than T errors are found. This indicates that the sync field has not been found, this process continues by reading the next sequence of bits until the sync field pattern is detected or the length of time allowed for sync field detection is exceeded as illustrated in FIG. 3b.

Figure 4A:
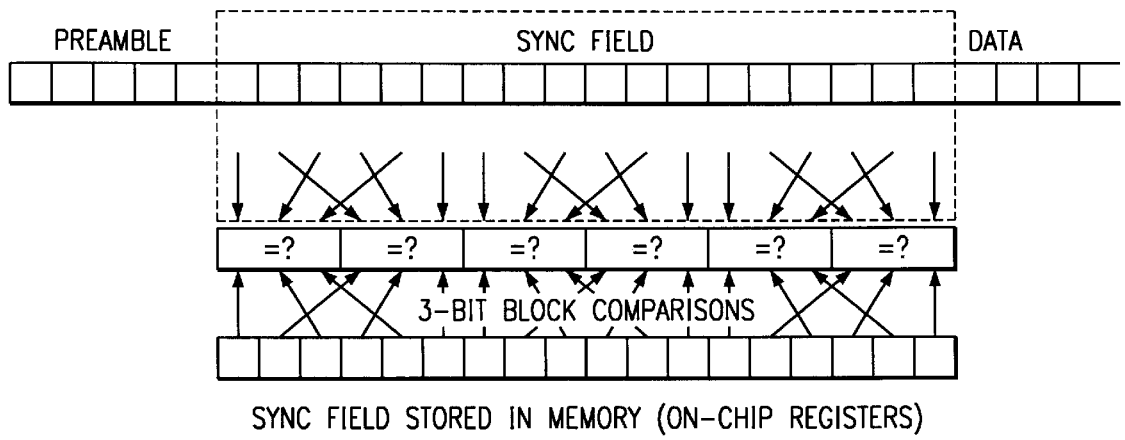
FIG. 4a illustrates a grouping of odd and even sub-sequences in a 3 bit block comparison sync field detector architecture.
Figure 4B:
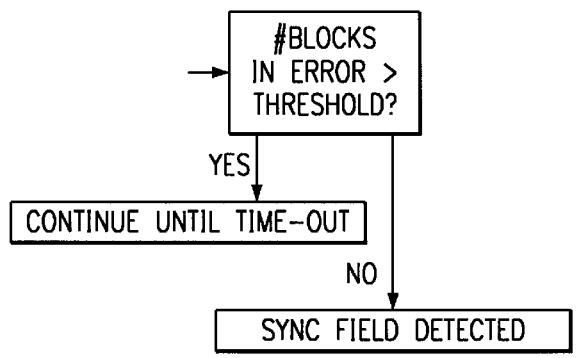
FIG. 4b illustrates the same as FIG. 3b.

In order to achieve the speed requirements of some applications, for example, 140 Mb/s, the comparator device could be used constructed with, for example, adjacent individual devices of the same construction by having the each adjacent device read a different set of bits and run at a lower clock speed. For example, a device may be positioned such that it receives 18 new bits for comparison every ninth bit. This construction results in each 18-bit section running at ⅑ the clock speed, allowing power savings over the circuitry required to run at the full speed of the data. Another implementation of sync field detection circuit may reduce power and die size. Instead of single-bit comparators, this detection circuit 300 may include six 3-bit comparators to make comparisons to accept or reject the 18-bit sync field as illustrated in FIG. 4. These 3-bit blocks of comparators may save die area because the total area occupied by the comparators can be made smaller. However, single-bit comparisons are illustrated to provide better performance, in terms of probabilities of misdetection and false alarm, than grouping bits together. The poorer performance is achieved because decisions are then based on the number of 3-bit blocks which are detected in error. For example, a single bit in error removes the discrimination capability of the two other bits in the block since the entire block would be detected in error. A detector device 300 using a 3-bit comparison or any number of comparisons other than 1 is sub-optimal in this sense, but required performance levels for the probabilities of missed detection and false alarm can be achieved by employing additional techniques.

The three-bit comparisons are implemented advantageously to increase the likelihood that Viterbi algorithm (VA) error events affect the same block of three bits. For example, if the sequence of sampled data is split into even and odd sub-sequences, a two state, 1-D' (where D'=the duration of two delays in the 1-D² channel) VA is provided for each sub-sequence. Error events occur in either of the even or odd VA when paths through the trellis diverge and then converge incorrectly. The data decisions at the diverging and converging trellis branches constitute a pair of bit errors. Under a variety of noise conditions over 90% of the time, the length of an error event in a sub-sequence is two or three. (D-) The data from the recording medium is therefore rearranged as shown by the arrows. For example, the second bit of the sync field is moved to first bit position of the second comparator, as shown in FIG. 4, into 3-bit blocks for comparison to increase the likelihood that pairs of errors in the odd or even sequences of the are compared together, thus resulting in only one 3-bit block to be in error rather than two. The implications of error pairing are discussed in detail in the Pair Error Rate sub-section below.

Probability Calculations

Figure 5:
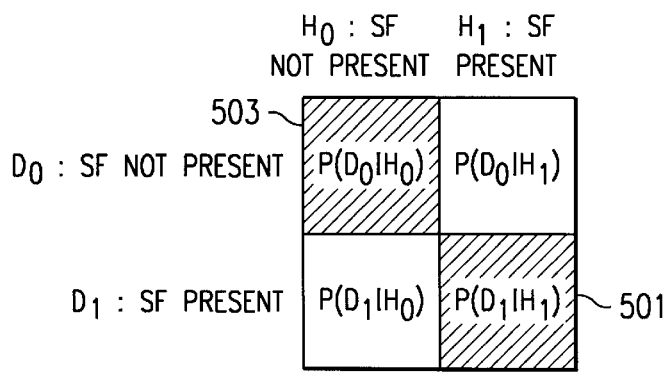
FIG. 5 illustrates a division of probability space for sync field decisions.

By using probabilities, the identification of the sync field can be improved. The probability space of sync field detection may be divided as shown in FIG. 5. There are two possible conditions for the bits in the sync field detector's comparator which are represented by the following hypothesis:

Let $H_0$ represent the hypothesis that the sequence in the comparator is not the sync field;

Let $H_1$ represent the hypothesis that the sequence in the comparator is the sync field.

Two decisions are also possible based on the number of errors detected by the comparator:

Let $D_0$ represent the decision that the sequence in the comparator is not the sync field;

Let $D_1$ represent the decision that the sequence in the comparator is the sync field.

Therefore, the blocks 501, 503 of FIG. 5 indicate correct decisions. That is, deciding that the sync field is not present, when the sequence in the comparator is not the sync field ($D_0$, $H_0$); and deciding that the sync field is present, when the sequence in the comparator is, in fact, the sync field ($D_1$, $H_1$).

These definitions provide definitions for the probabilities. Specifically:

$P(D_1|H_0)$=Probability of false alarm, and $P(D_0|H_1)$=Probability of missed detection.

In other words, $P(D_1|H_0)$ is the probability of incorrectly deciding the sync field is present in the detector's comparators, while the sync field, in fact, is not present. Similarly, $P(D_0|H_1)$ is the probability of incorrectly deciding the sync field is not present in the detector's comparators, while the sync field, in fact, is present. Because decisions are based on whether the detected number of errors exceeds the threshold T, the following are equivalent definitions:

$P(\leq T \text{ errors}|H_0)=P(D_1|H_0)$=Probability of false alarm, $P(>T \text{ errors}|H_1)=P(D_0|H_1)$=Probability of missed detection and, obviously, $P(\leq T \text{ errors}|H_1)=P(D_1|H_1)=1-P(D_0|H_1)$=Probability of correctly detecting the sync field, while it is present.

First the probability of missed detection is derived. This is the condition in which the sync field is in the sync field detector, but more than T errors are detected in the bits. This causes the true sync field to be rejected by the detection device. Let t represent the number of bits in error. Let N represent the number of bits in the sync field. Presuming independent bit errors, the probability of missed detection may be calculated by multiplying the probability of t bits being in error by the probability that N-t bits are correct, multiplied by the number of ways t bits can be uniquely arranged among N bits ("N choose t" given by the binomial coefficient). The total probability, $P(D_0|H_1)$, is the sum of this product for $t \in [T+1, N]$. In equation form, $$P(D_0|H_1) = \sum_{t=T+1}^{N} \binom{N}{t} (BER)^t (1-BER)^{(N-t)}. \qquad (1)$$

It will be more convenient in subsequent analysis to rewrite (1) as $$P(D_0|H_1) = 1 - P(D_1|H_1) = 1 - \sum_{t=0}^{T} \binom{N}{t} (BER)^t (1 - BER)^{(N-t)}. \quad (2)$$

Figure 6:
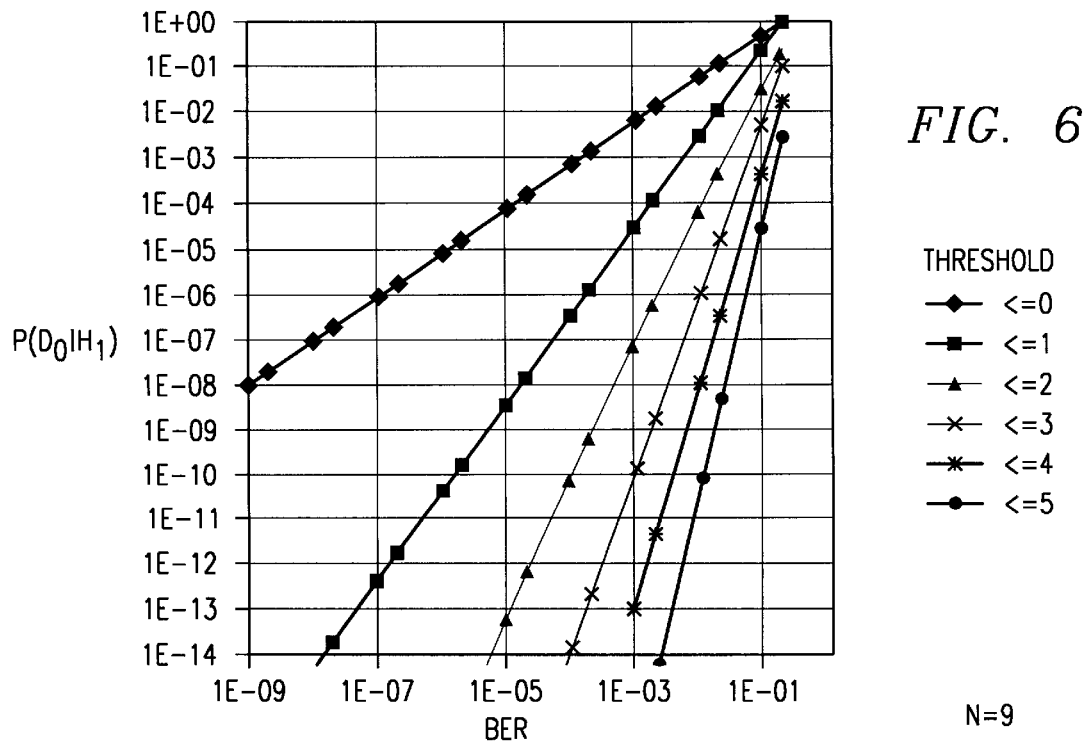
FIG. 6 illustrates the probability of missed detections for a 9-bit sync field in a single-bit comparison sync detector architecture.

A plot of the probability of missed detection as a function of BER and T for N=9 and 18 is shown in FIG. 6. Clearly, higher thresholds provide better (lower) probabilities of missed detection. This is because more bits are allowed to be in error before the true sync pattern is rejected. This probability is almost completely pattern independent. $P(D_0|H_1)$ is affected by the length of the sync field in that longer length allows a higher threshold of errors to be accepted. The relationship between length and threshold is explained when $P(D_1|H_0)$ is examined below. Note also that $H_1$ occurs only one time during the sync field detection process (zero times if the preamble, or preamble and some of the sync field, is falsely detected as the sync field).

FIG. 6 illustrates the probability of missed detections. For illustration, suppose it is desired that $P(D_0|H_1) \leq 10^{-9}$ at an SNR of 13 dB. This low SNR condition reflects that the head may still be settling onto the track and the absence of ECC during the sync field. For some application, 13 dB corresponds to a BER of about $2*10^{-5}$. Because error events in the PR4 VA are actually pairs of errors, the pair error rate (PER) is PER=BER/2=$10^{-5}$. In the analyses discussed below, the results will be interpreted in light of this correlation of errors (pairing). However, at this point for purposes of explaining, independent bit errors are assumed, and the convenient coordinates of BER=$10^{-5}$ and $P(D_0|H_1)=10^{-10}$ are selected.

If no errors are allowed (T=0), the probability of missed detection is $P(D_0|H_1)=(1-(1-BER)^N)=(1-(1-10^{-5})^{18})=1.8*10^{-4}$, as seen in FIG. 6. If the threshold is raised to T=2, then 0, 1 or 2 errors are allowed. In this case, $$P(D_0|H_1) = \left(1 - \binom{18}{0}(1-BER)^{18} - \binom{18}{1}(1-BER)^{17} \cdot (BER)^1 - \binom{18}{2}(1-BER)^{16} \cdot (BER)^2\right) P(D_0|H_1) = 8.2*10^{-13}.$$

To achieve the performance target, FIG. 6 shows that T must be set to at least two for the N=9 bit case. Note that $P(D_0|H_1)$ is dominated by the term $(BER)^T$.

Figure 7:
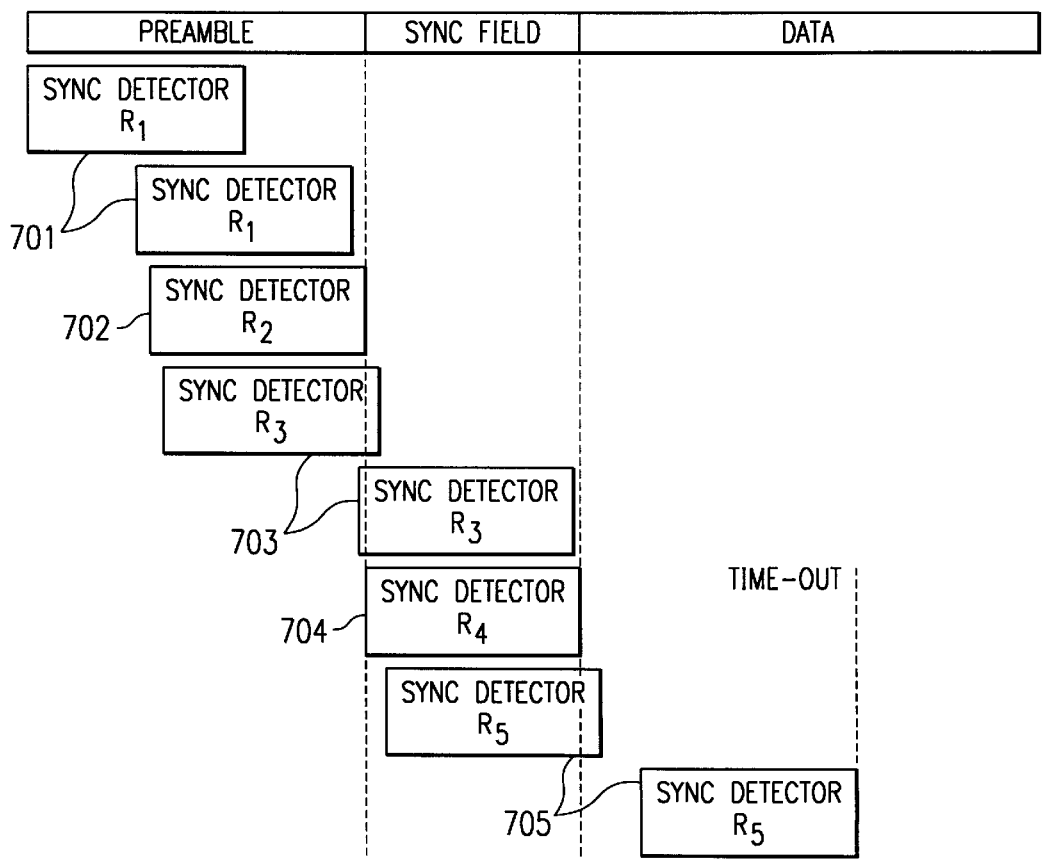
FIG. 7 illustrates sub-divisions of hypotheses $H_0$ and $H_1$.

Next, the probability of false alarm, $P(D_1|H_0)$, is determined. The hypothesis $H_0$ may be explained by dividing the preamble, sync field and data into several regions $R_1$–$R_5$ (701–705). These regions are shown in FIG. 7 and represent the area that the detection device 300 is searching for the sync field. Region $R_4$ 704 corresponds to $H_1$, and $H_0 = \cup_{(i \neq 4)} R_i$. The search for the sync field typically begins in Region $R_1$ 701. If the sync field is not correctly detected in region $R_4$ 704, and a false alarm has not already occurred, region $R_5$ will be entered. Region $R_5$ 705 ends with a time-out, if no sync field is detected. Note that if the sync field is detected in any region other than $R_4$, the ECC will likely send up a flag for excessive errors and trigger a retry on the next revolution assuming the magnetic medium is a hard disk drive. A retry on the next revolution will also occur if time-out is reached.

Next, a discussion follows of the error conditions which will cause the preamble, which is an all 1's pattern before $1/(1 \oplus D^2)$ pre-coding, to be mistaken for the sync field. For a sync field of N bits, and a threshold of T=0 bits in error, the preamble which may be all ones (1's) may be mistaken for the sync field if every preamble bit in the sync detector which corresponds to 0s in the sync field are detected in error, that is as 0's. This also requires that all of the other bits be detected correctly. The probability of this is given by $(BER)^{(dH)}*(1-BER)^{(N-dH)}$; there is exactly one combination of errors which yields this mistake. Here, dH is the number of places in which the sync field pattern differs from the pattern in the sync field detector. In the case of the all 1's pattern, dH is equal to the number of zeros in the sync field pattern. This parameter, dH, is known as the Hamming distance between binary code words.

If T bits are in error for sync field acceptance, the analysis is as follows. Specifically, only dH-T errors, in a particular order, are needed to mistake a pattern for the sync field. Therefore, the $P(D_1|H_0)$ is given by $$P(D_1|H_0) = \sum_{t=0}^{T} \binom{dH}{(dH-t)} (1 - BER)^{(N-(dH-t))}(BER)^{(dH-t)}. \quad (3)$$

Figure 8A:
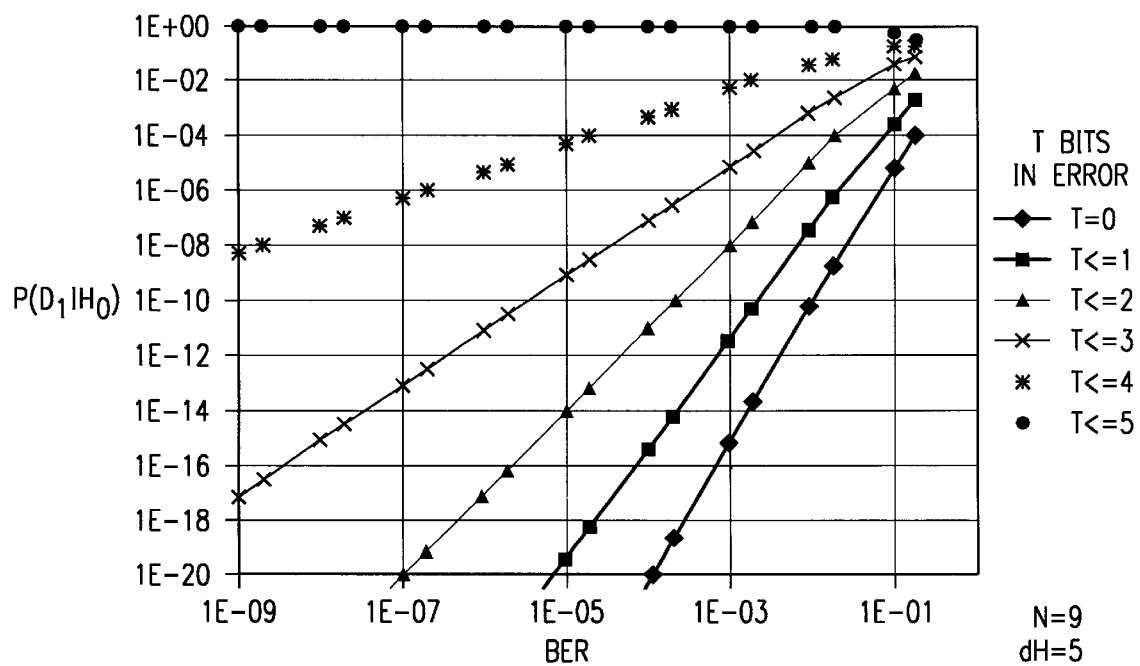
FIG. 8 illustrates the probability of false alarm for a 9-bit and an 18-bit sync field in a single-bit comparison sync field detector architecture.
Figure 8B:
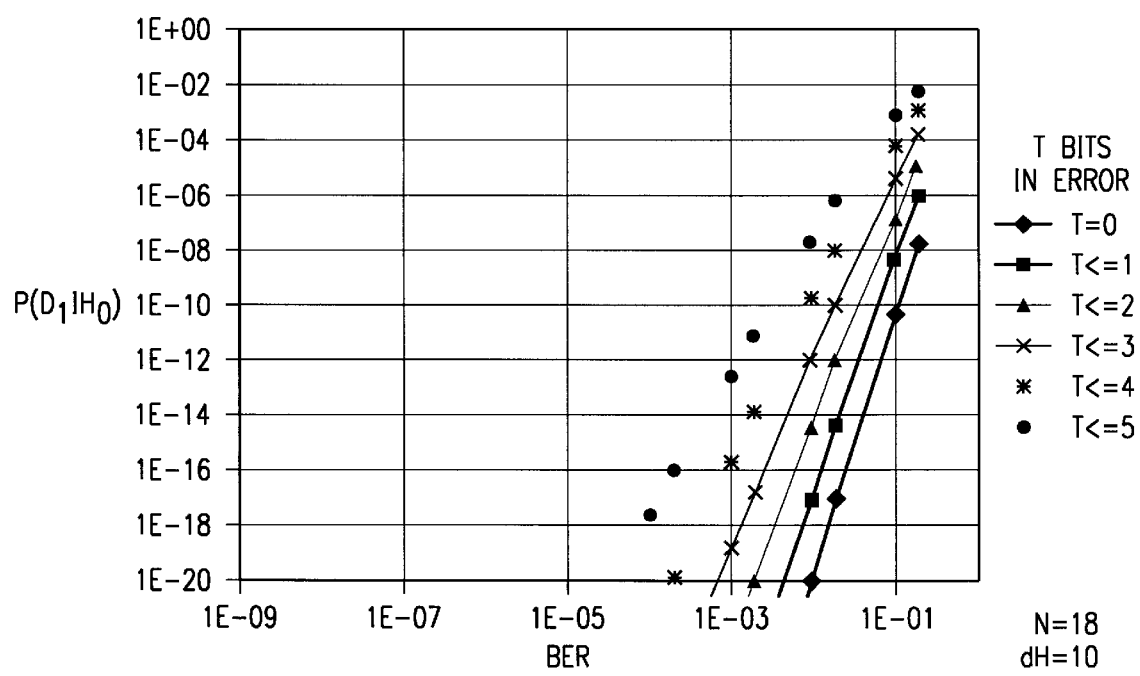

Equation (3) is plotted in FIG. 8 as a function of BER and T for N=9 and 18, with dH of 5 and 10, respectively. The value of increased Hamming distance for N=18 is illustrated. Further, a larger value of T can be selected in order to reduce $P(D_0|H_1)$. From FIGS. 6 and 8, in order to achieve probabilities of missed detection and false alarm of $10^{-10}$ at BER=$10^{-5}$, assuming independent bit errors, the operating conditions must be T=2 for N=9, dH=5; and T∈[2, 5 (or 6)] for N=18, dH=10.

Figure 9A:
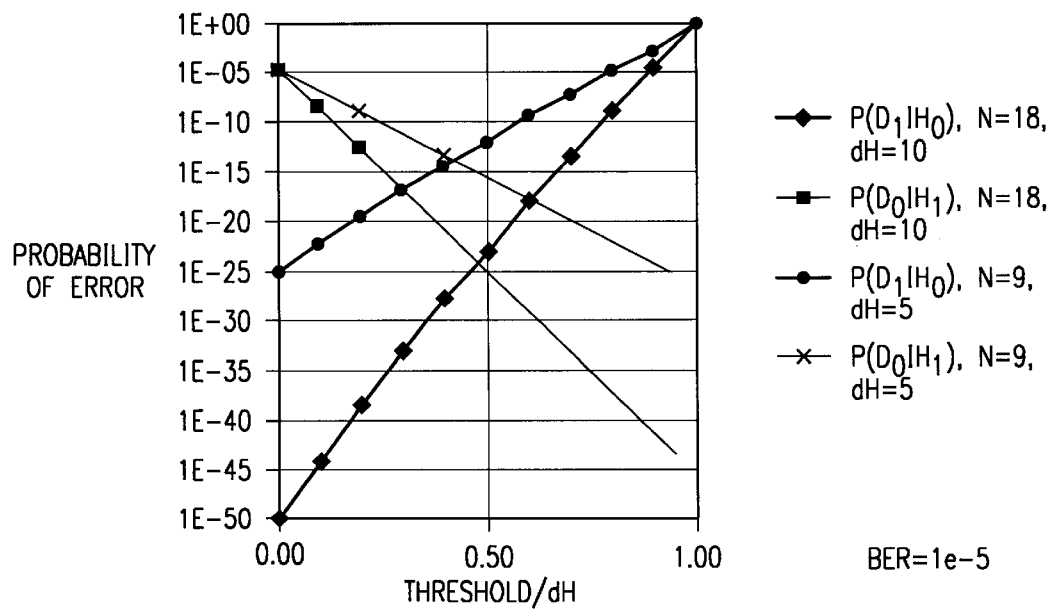
FIG. 9a illustrates the comparison of achievable probabilities of missed detection and false alarm.

Just as $P(D_0|H_1)$ is dominated by the term $(BER)^T$, $P(D_1|H_0)$ is dominated by the term $(BER)^{(dH-T)}$. This suggests a formalization for the trade off between missed detection and false alarm probabilities. Specifically, Hamming distance dH should be maximized, in order to allow for the largest possible T. This is limited by dH-T, therefore, ideally, dH-T=T. This implies the rule of thumb "set T=dH/2." It is at this point that the importance of long sync field length becomes apparent. The longer the sync field, the greater the Hamming distance that is possible. These points are illustrated in FIG. 9a by the intersection of $P(D_0|H_1)$ and $P(D_1|H_0)$, at about dH/T=0.5, for both values of N.

As different bits enter the comparators, the Hamming distance of the sync pattern from the bits in the comparator will change. A sync pattern should be selected which maintains a minimum Hamming distance from all possible shifts of the all 1's preamble and the sync field pattern itself. These are regions $R_1$ 701 through $R_1$ 703. Ideally, this minimum distance should be maintained over the data until the time out, but because the data is completely unconstrained, except for the RLL encoding, such as 8/9 (0,4,4). No minimum distance can be guaranteed in $R_5$.

Another consideration is that $R_1$ may span on the order of 100 bits. That is, the probability of false alarm may be increased by a factor of about 100 if the beginning of $R_1$ is not carefully timed by the detection device. With such care in timing, this multiplicative factor can be reduced to the order of 10. This implies that the target $P(D_1|H_0)$ should be about $10^{-11}$ to achieve the probability goals stated above.

Figure 9B:
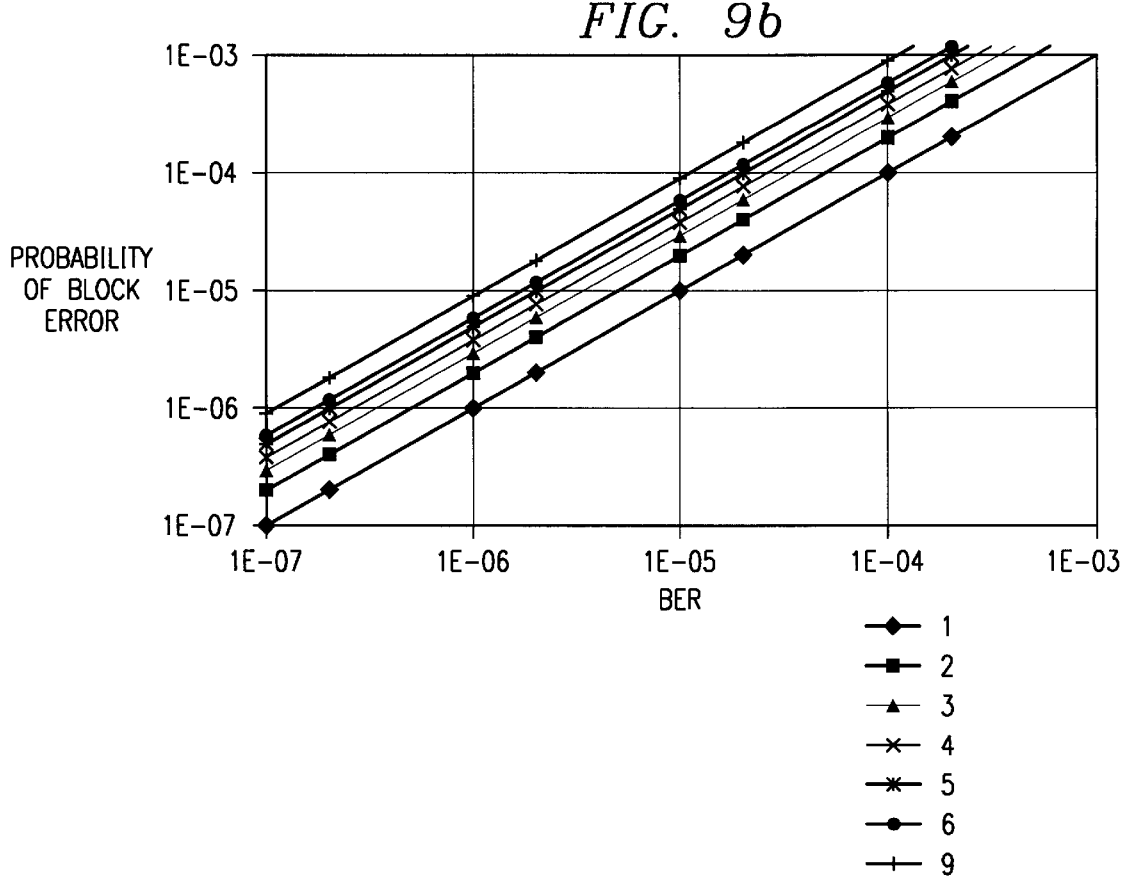
FIG. 9b illustrates the block error rate as a function of the BER for various values of bits/blocks.

The effect of the implementation of six 3-bit comparison blocks, for example, are examined. For the sync field not to be detected, more than T blocks must be in error. This is a larger percentage of the sync field than 3 bits, because a total of only 6 blocks are available. The probability of a block error, assuming independent bit errors, is given by $(1-(1-BER)^3)$, that is one minus the probability that all three bits in the block are detected correctly. FIG. 9b is a plot of the probability of a block error vs BER as a function of block size. This plot shows that about a half of an order of magnitude in error rate is lost because of the 3-bit block comparisons. This is equivalent to a few tenths of a dB loss in SNR.

The probability of missed detection, as a function of threshold, is determined by the probability that more than T blocks are detected in error, when in region $R_4$ 704 ($H_1$). There are "6 choose T" (the binomial coefficient) ways for the blocks in error to be arranged. The formula is:

$$P(D_0|H_1) = 1 - \sum_{t=0}^{T} \binom{6}{t} ((1-BER)^3)^{(6-t)} \cdot (1-(1-BER)^3)^t. \quad (4)$$

Figure 10A:
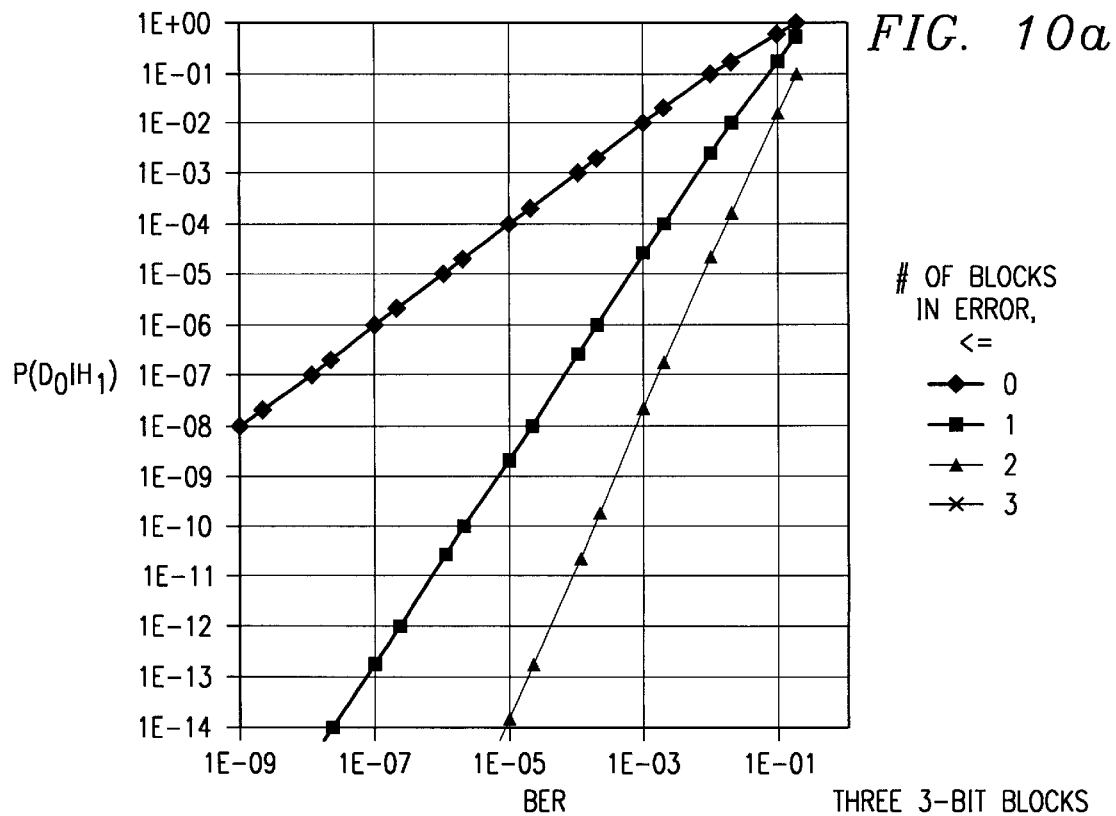
FIG. 10 illustrates the probability of missed detection (3-bit block comparisons)
Figure 10B:
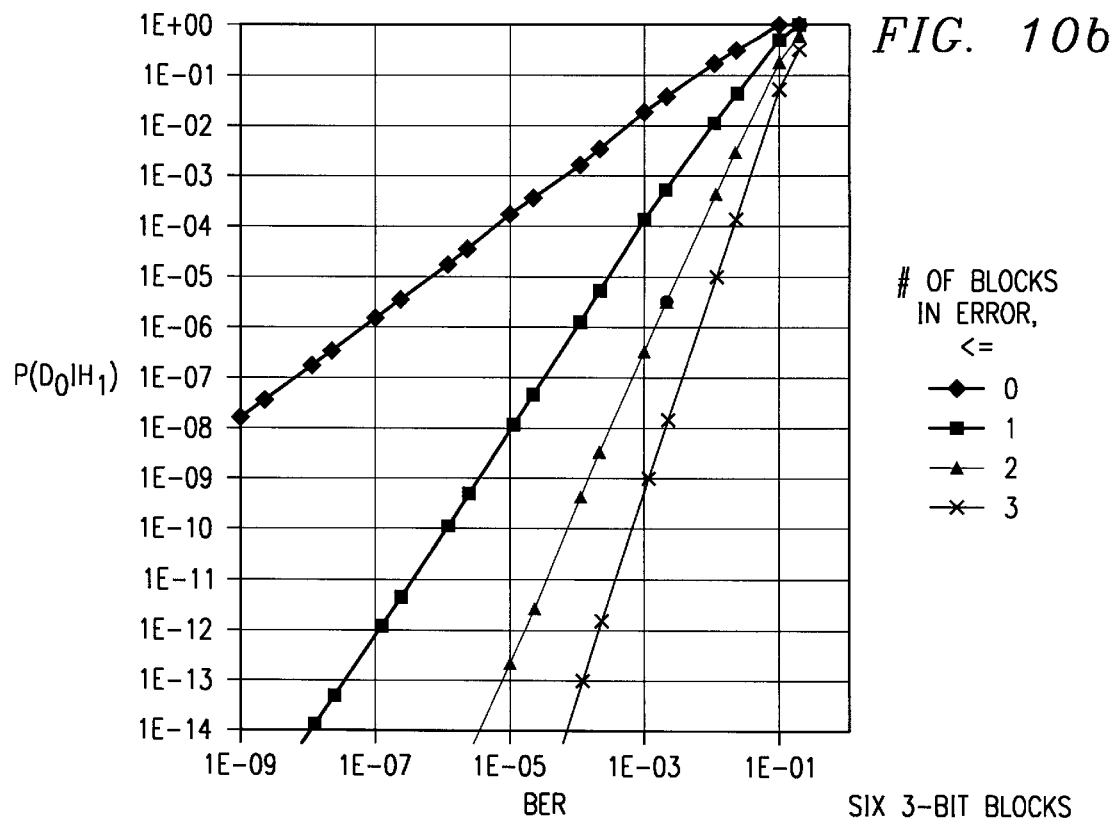

FIG. 10 shows the probability of missed detection for three and six 3-bit block sync field detectors. These probabilities are slightly lower (better) than the corresponding probabilities for the single-bit detectors. These probabilities are lower, because more errors can be tolerated (in the same block) before rejecting the sync field pattern. Slightly lower, because the probability associated with the additional within block errors is on the order of $BER^2+BER^3$.

Figure 11A:
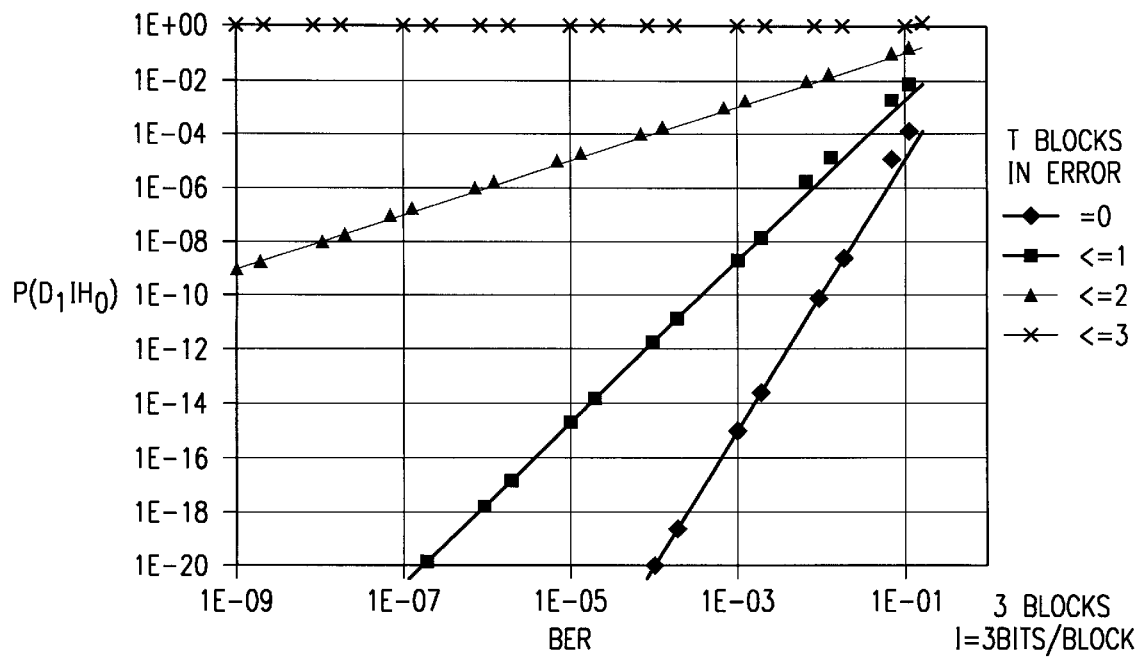
FIG. 11 illustrates the probability of a false alarm (3-bit block comparisons)
Figure 11B:
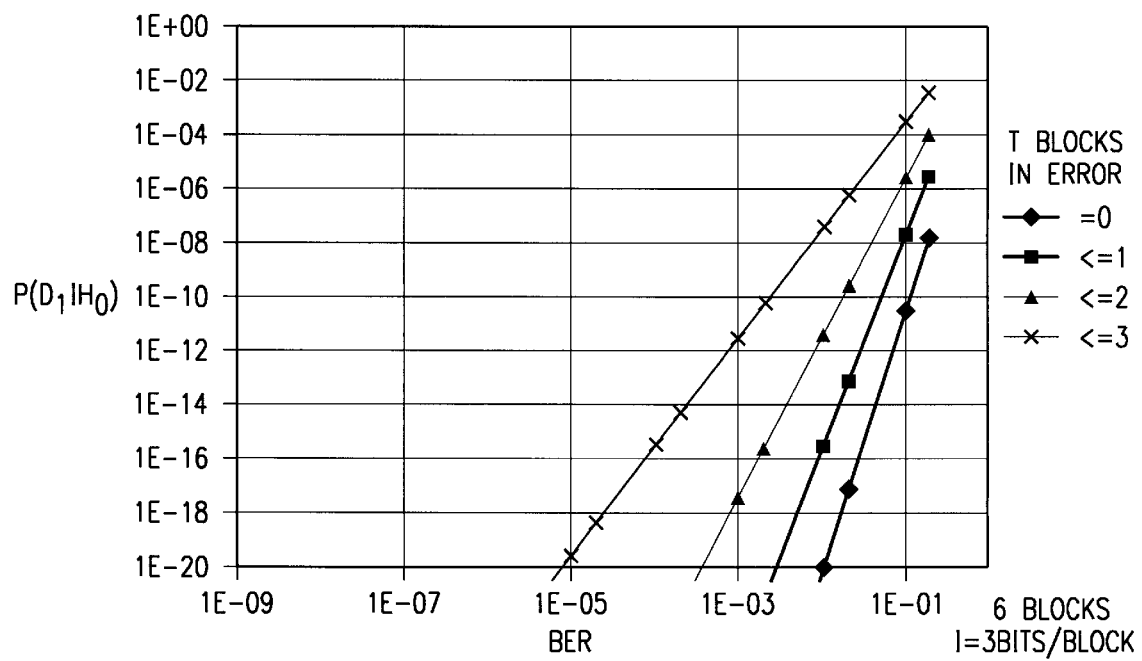

The calculation to determine the probability of false alarm is complicated because each 3-bit block has its own Hamming distance. Therefore, when permutations of blocks in error are made, the correct probabilities of block error, based on that block's dH, should be used. This has been calculated for threshold values from 0 to 3 blocks in error, for a user specified dH for each block of [2 1 2] for the dH=5 case and [2 1 2 2 1 2] for dH=10 as examples. FIG. 11 shows the results of these calculations for $P(D_1|H_0)$ for three and six 3-bit blocks, with Hamming distances of 5 and 10 respectively.

Figure 12:
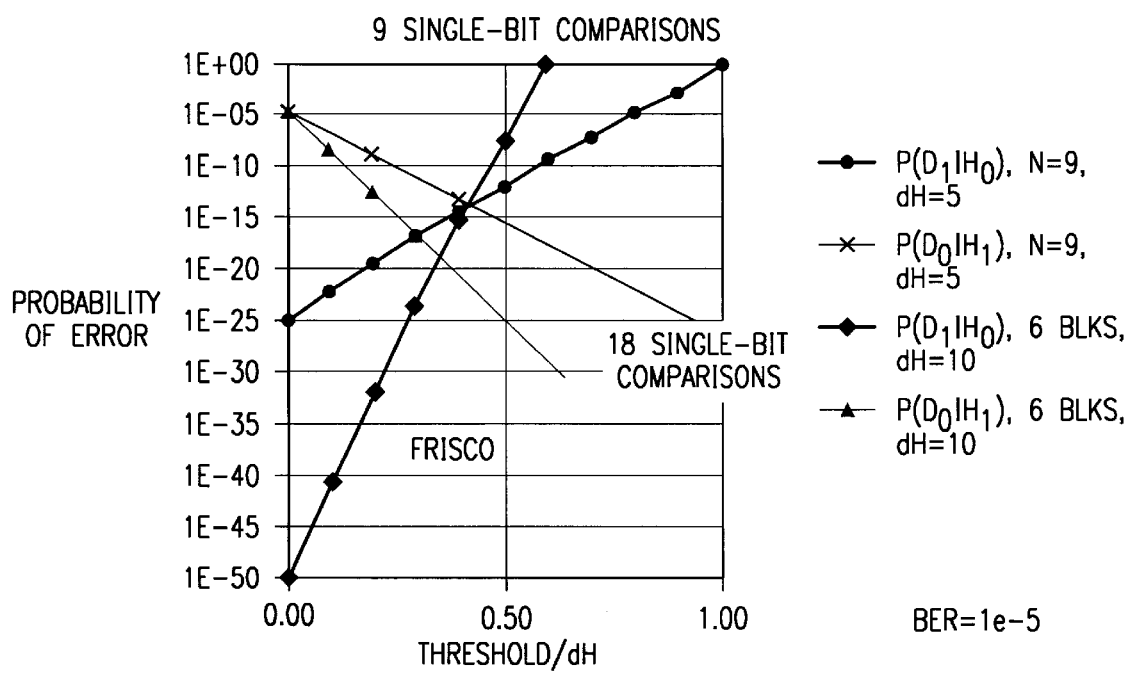
FIG. 12 illustrates the approximation of 3-bit sync comparisons vs. single-bit comparisons.

As an approximation, the Hamming distance may be averaged over the blocks. That is, for the case of six 3-bit blocks, each block is given an "average" Hamming distance of dH/6. This implies that the block must have dH/6 bit errors and 3-dH/6 correct bits to be mistaken for a correct sync field block. Thresholds, of course, refer to block errors in this context. Using this approximation, comparison between the performance of six 3-bit comparison blocks with single-bit comparison blocks can be made. This is shown in FIG. 12. Again, for independent bit errors, there are small differences in performance between the nine single-bit comparison blocks and the 3-bit comparison blocks. In the sub-section on Pair Error Rate below, it is shown that the difference between nine single-bit comparisons as compared with six 3-bit block comparisons is even smaller.

Pair Error Rate (PER)

Figure 13:
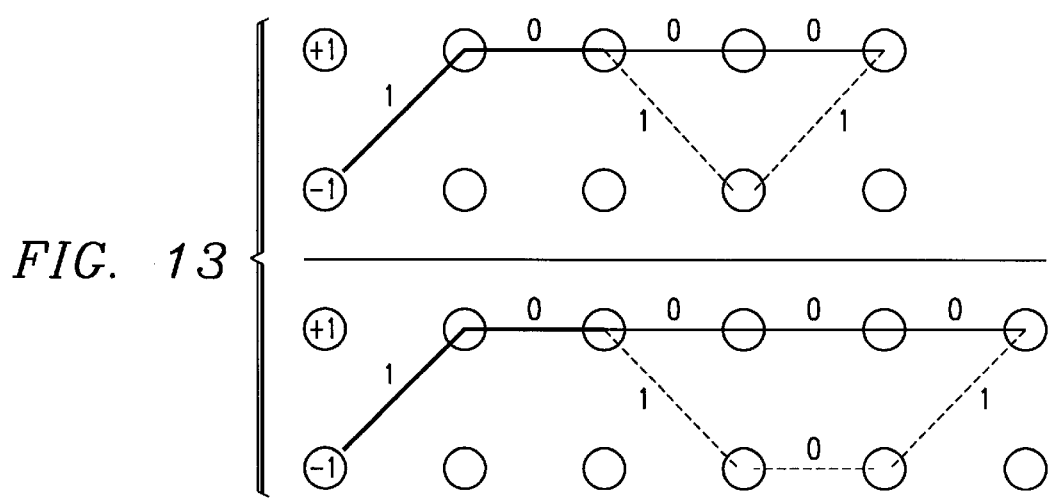
FIG. 13 illustrates a minimum distance error event for one leg of a de-interleaved Partial Response Class IV (PR4) trellis.

The analyses above assumed independent bit errors. In the PR4 VA, the most likely error events are independent pairs of errors which span 2 to 3 trellis branches. That is, pair errors are independent, but bit errors are not independent. Therefore, after the first bit error is made, the next bit error is very likely to occur one or two bits later, in the same odd or even data sequence. These two error events are shown in FIG. 13. The following analyses assumes that the error event lengths of two and three are equally likely. For convenience, define PER2 as the probability of an error event of length two beginning at a particular bit, and define PER3 as the probability of an error event of length three beginning at a particular bit. Note that a pair error=2 bit errors; and PER=BER/2. Hence, PER2=PER3=0.5*PER=0.25*BER.

For single-bit comparisons, the analysis is, once again straightforward. Here, however, approximations are used because comparisons are clearer when the same approximations are used for each sync detection architecture. Specifically, for the single-bit comparison cases, the probability that a particular bit is in error is PER (the probability that a pair error begins at this bit)+PER3 (the probability that a pair error began two bits ago and that its length is three)+PER2 (the probability that a pair error began one bit previous and that its length is two)=2*PER. Therefore, the probability of detecting all N bits without error (T=0) is approximated by $(1-2*PER)^N$.

FIG. 13 illustrates the most likely error events in each de-interleaved (odd and even) sub-sequence of the PR4 Viterbi trellis. Error event of length 2 and error event of length 3 are shown with the dashed line. The heavy line indicates the merged path of previous decisions.

The probabilities of missed detection and false alarm are dominated by the error terms (and affected to a much lesser degree by the correct bits ~(1−2*PER)). Therefore, the solution to determining probabilities of missed detection and false alarm concentrate on the error terms. For the probability that one or more bits are detected in error, one error is not likely to happen, but a pair of errors will occur with probability ~PER. Three or more errors will occur with probability ~$PER^2$. However, four or more errors will occur with probability ~$PER^2$ as well. Similarly, five or more errors and six or more errors each are dominated by the terms containing $PER^3$.

The six 3-bit comparison blocks include the grouping of bits in the sync field detector to ensure that the probability of an error event (pair error) of length 2 beginning and ending within the same 3-bit comparator is 2/3. The probability that an error event of length 3 begins and ends within the same 3-bit comparator is 1/3. Without the grouping, error events of length three would result in two different 3-bit comparators with probability 1. Again, assuming that the probability of an error event of length two or three is equally likely, the probability that a pair error will affect one 3-bit block is 0.5*2/3+0.5*1/3=0.5. Similarly, the probability that a pair error will affect two 3-bit blocks is also 0.5, and next, $PER_1$ (=0.5*PER) is defined as the probability that a pair error affects exactly one 3-bit comparator. $PER_2$ (=0.5*PER) is defined as the probability that a pair error affects exactly two 3-bit comparators. These definitions are independent of the error event length (provided the length is two or three).

Using the six 3-bit block comparisons, the probability that no blocks are detected in error is approximately $((1-PER_1-PER_2)^3)^6=(1-PER)^{18}$. The probability of one or more blocks in error may be dominated by ~$PER_1+PER_2$. The probability of two or more blocks in error may be dominated by ~$PER_2$. The probability of three or more blocks in error may be dominated by ~$PER_2*PER_1+PER_2^2$. The probability of four or more blocks in error may be dominated by ~$PER_2^2$.

The probability of false alarm for single-bit comparisons can be derived as above, except that the number of errors which must be made to accept the current bits as the sync pattern is dH-T. By using the six 3-bit block comparisons, false alarms are examined in more detail. For false alarms, the error probability is dominated by the 6-T blocks with the smallest Hamming distances (dH of each block $\epsilon[0,3]$). These 6-T blocks should have exactly the correct errors to make their 3*(6-T) bits look exactly like the corresponding bits of the sync pattern. To make the analysis more general, assume an average Hamming distance of 10/6=1 2/3 per block. It is, of course, not possible for a block to have a non-integer Hamming distance. In this analysis, rounding is used. For T=1 block, the number of bit errors needed to make the remaining 5 blocks, each of average Hamming distance 1 2/3, look exactly like the remaining 15 bits of the sync pattern is ROUND(5*(1 2/3))=8. The probability of 8 bit errors may be dominated by ~$PER^4$. For T=2, ROUND(4*(1 2/3))=7 bits must be in error. This may be dominated by ~$PER^4$. For T=3, ROUND(3*(1 2/3))=5 bits must be in error. This may be dominated by ~$PER^3$. For T=4, ROUND(2*(1 2/3))=3 bits must be in error. This may be dominated by $\sim PER^2$. Table 1 lists the approximate probabilities of error for each type of detector over a range of threshold settings. When comparing the probability of error over T=2, 3 and 4 blocks in error, these may be approximately $PER^2$. The case of T=3 blocks gives slightly better performance.

Table 1 approximates dominant error probability for each detector architecture, assuming independent pair errors. The number in parentheses indicates bit errors required to accept the current pattern as the sync field pattern. Settings for the best over-all error rate may be in the dashed boxes.

dominated by the selection of dH and T (T/dH), for a given N and BER (PER). A larger N allows a larger dH which allows a larger T. Because of these relationships, for any BER (PER) and N, the largest dH possible is desired. Table 1 above then indicates the proper value of T.

Figure 14A:
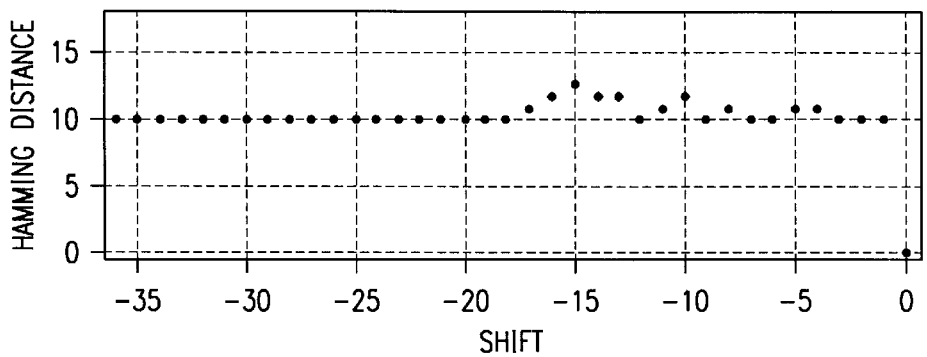
FIG. 14 illustrates the Hamming distance in various regions for a particular pattern.
Figure 14B:
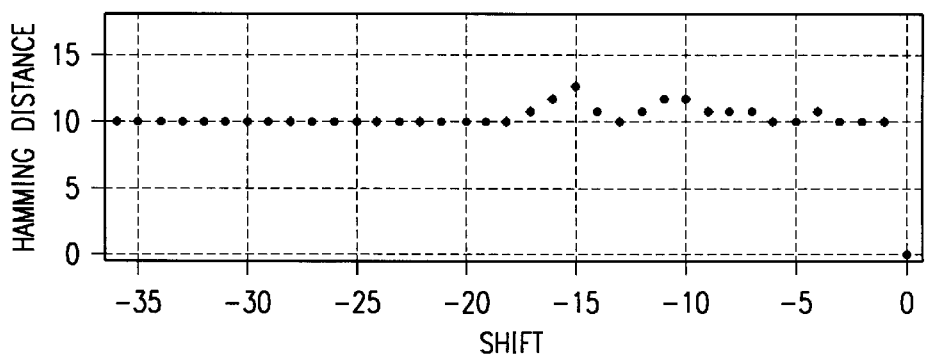

First, the effect of Hamming distance, dH, is determined. The Hamming distance in region $R_4$ 704 is 0. The goal, therefore, is to have dH be as large as possible for all shifts of the sync field detector over $R_1$ 701 to $R_3$ 703 and in $R_5$ 705 (data). FIG. 14 shows the Hamming distance of two

TABLE 1

| Detector | T | $P(D_1|H_0)$ | $P(D_0|H_1)$ | Approximate Dominant Error Probability for PER = $10^{-5}$ |
|---|---|---|---|---|
| 18 single-bit | 2 bits | (8) ~ $PER^4$ | ~ $PER^2$ | $10^{-10}$ |
| $dH_{min}$ = 10 | 3 bits | (7) ~ $PER^4$ | ~ $PER^2$ | $10^{-10}$ |
|  | 4 bits | (6) ~ $PER^3$ | ~ $PER^3$ | $10^{-15}$ |
|  | 5 bits | (5) ~ $PER^3$ | ~ $PER^3$ | $10^{-15}$ |
|  | 6 bits | (4) ~ $PER^2$ | ~ $PER^4$ | $10^{-10}$ |
| 6 3-bit blocks | 1 block | (8) ~ $PER^4$ | ~ $PER_1$ + $PER_2$ | $10^{-5}$ |
| $dH_{min}$ = 10 | 2 blocks | (7) ~ $PER^4$ | ~ $PER_2$*$PER_1$ + $(PER_2)^2$ | $0.5*10^{-10}$ |
| (n) = ROUND((6-T)* | 3 blocks | (5) ~ $PER^3$ | ~ $(PER_2)^2$ | $0.25*10^{-10}$ |
| (1 2/3)) | 4 blocks | (3) ~ $PER^2$ | ~ $(PER_2)^2$*$PER_1$ + $(PER_2)^3$ | $10^{-10}$ |
| 9 single-bit | 1 bit | (4) ~ $PER^2$ | ~ PER | $10^{-5}$ |
| $dH_{min}$ = 5 | 2 bits | (3) ~ $PER^2$ | ~ $PER^2$ | $10^{-10}$ |
|  | 3 bits | (2) ~ PER | ~ $PER^2$ | $10^{-5}$ |

Determining The Sync Field Patterns

For a sync field of length N and a binary alphabet, there are $2^N$ possible unique sync field patterns. Therefore, N=9 yields 512 unique patterns and N=18 yields 262,144 unique patterns. One of the best patterns among these $2^N$ patterns is the one that minimizes jointly $P(D_0|H_1)$ and $P(D_1|H_0)$. From the analyses above, important factors in this minimization are N, dH, BER (PER) and T. Another important fact is the position of the sync field with in the sync detection internal; that is, how soon the sync field is encountered after beginning the sync pattern detection process. This has a direct effect on tradeoffs between patterns and condition which minimize $P(D_0|H_1)$ at the expense of $P(D_1|H_0)$ and vice versa.

(Both sync pattern lengths of interest, N=9 and 18, are examined. $P(D_0|H_1)$ should be dominated by the selection of T, for a given N and BER (PER). $P(D_1|H_0)$ should be particular 18 bit sync field patterns for all shifts over the range of $R_1$ 701 to $R_4$ 704. R4 is point 0; $R_3$ 703 is points −1 to −17; $R_2$ 702 is point −18 (−N); 18 points of $R_1$ 701 are shown from −19 to −36. In order to determine the sync pattern, a series of screens is employed to eliminate unacceptable sync patterns. These screens are applied serially. The first screen for sync field patterns is that the minimum dH over all shifts of the detector from $R_1$ to $R_3$ must be at least $dH_{min}$. When the preamble is an all 1s pattern, a first screen speeds up the search for the sync pattern by rejecting any pattern that has less than $dH_{min}$ 0s. Table 2 shows the number of N-bit patterns that have a Hamming distance of at least $dH_{min}$ over all shifts in $R_1$ 701 to $R_3$ 703. Table 3 lists the specific patterns of interest. The patterns shown in FIG. 14 are the 18-bit patterns 2 and 3 in Table 3.

Table 2 illustrates number of N-bit sync field patterns with $dH \geq d_{min}$.

TABLE 2

| N | $dH_{min}$ = 4 | $dH_{min}$ = 5 | $dH_{min}$ = 6 | $dh_{min}$ = 9 | $dh_{min}$ = 10 | $dH_{min}$ = 11 |
|---|---|---|---|---|---|---|
| 9 | 119 | 7 | 0 | | | |
| 18 | | | | 2215 | 4 | 0 |

TABLE 3

Candidate Sync Field Patterns.

| N | | Pattern | After Pre-coder (1/(1⊕$D^2$) | $dH_{min}$ |
|---|---|---|---|---|
| 9 | 1* | 000010110 | 000010010 | 5 |
|  | 2 | 000011010 | 000011101 | |
|  | 3 | 000100101 | 000101110 | |
|  | 4* | 000101001 | 000100001 | |
|  | 5* | 000101101 | 000100100 | |

TABLE 3-continued

Candidate Sync Field Patterns.

| N | | Pattern | After Pre-coder (1/(1⊕D²)) | dH$_{min}$ |
|---|---|---|---|---|
| | 6 | 000110010 | 000111101 | |
| | 7 | 010000110 | 010101101 | |
| 18 | 1 | 000001100110101001 | | 10 |
| | 2 | 000011001001010111 | 000011110100010011 | |
| | 3 | 000100010110100111 | 000101000111010011 | |
| | 4 | 000100011101001011 | | |

This first screen for Hamming distance greatly reduces the number of patterns which must be considered in order to obtain the sync screen. Selection of one of the patterns which represent the dH$_{min}$ in Table 3 increases the probability of correct sync field detection and the probability that the detection device will not enter region R$_5$ 705.

The BER (PER) during the sync pattern is also an important factor, but it affects all implementations and patterns similarly. BER (PER) is linked to SNR, so one would like to select a pattern which maximizes SNR during synchronization. Hence, the spectral content of each surviving candidate sync pattern from the previous screens is compared with that of the ideal or predetermined PR4 response for example. Sync patterns whose energy is concentrated in the center of the PR4 response are favored because they are expected to have a higher SNR compared to other candidate patterns.

FIG. 15 shows the spectra of the seven 9-bit patterns. Patterns 1, 4 and 5 are preferred because their energy is concentrated more closely in the center of the PR4 spectrum. The remaining patterns can be disregarded.

Figure 16A:
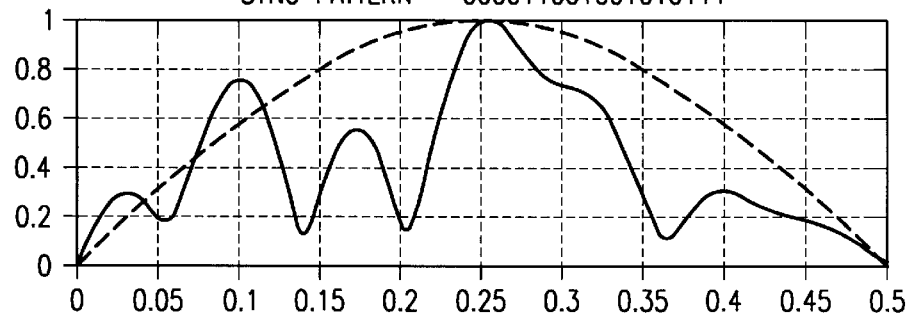
FIG. 16 illustrates the spectra of the two surviving 18-bit sync patterns and the ideal PR4 response.
Figure 16B:
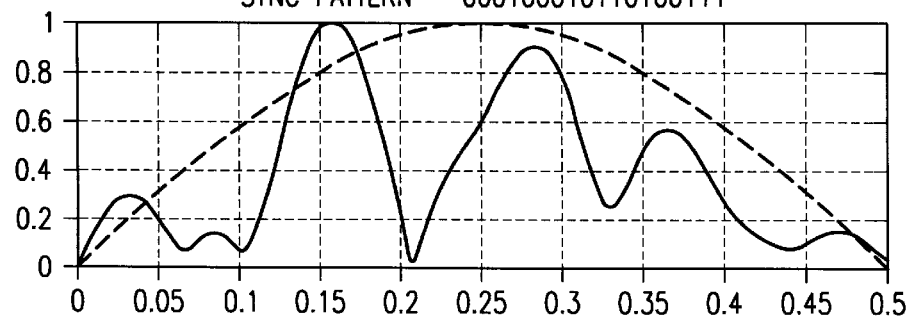
Figure 15A:
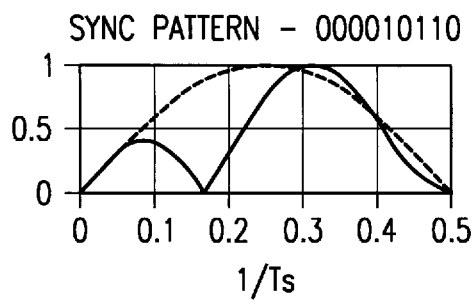
FIG. 15 illustrates the spectra of the seven candidate 9-bit sync patterns and the ideal PR4 response.
Figure 15E:
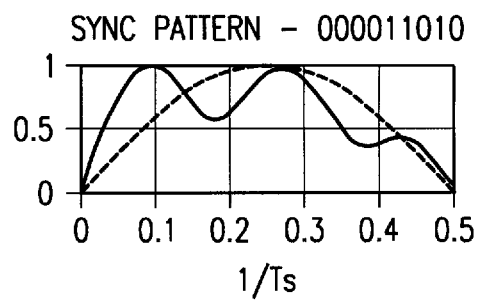
Figure 15B:
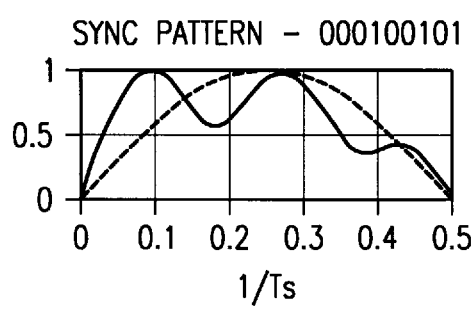
Figure 15F:
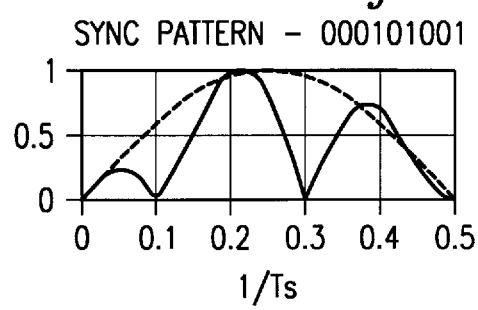
Figure 15C:
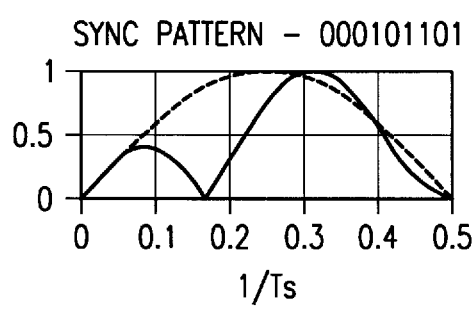
Figure 15G:
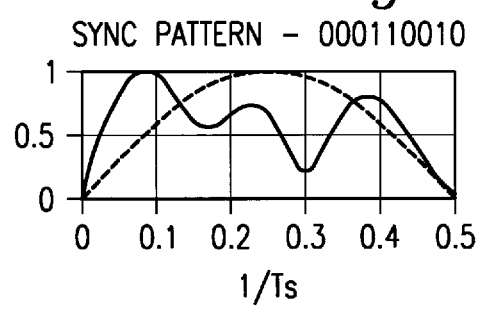
Figure 15D:
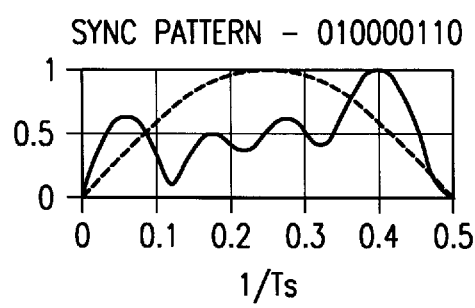

FIG. 16 shows the spectra of the two surviving 18-bit candidates to be evaluated. Neither pattern is clearly the preferred; number 2 may be slightly favored. Because its energy appears to be more concentrated in the center of the PR4 spectrum. These sspectra were calculated by taking the FFT of a waveform constructed using sinc functions to achieve the ideal band-limited PR4 impulse response of +10−1.

Returning to the concept of Hamming distance for a moment, if the sync field detector does pass the sync field, then it is desirable to have a very low probability of false alarm in the data field until time-out. To do this, it is desirable to guarantee a minimum dH as the data pattern shifts into the sync field detector. However, encoded user data can be any sequence that is legal in the RLL code. Therefore, it is possible that the first N bits of encoded user data may be exactly the sync pattern. The probability of this is on the order of $1/2^N$, since not all $2^N$ combinations of N bits are possible with the 8/9(0,4,4) code, for example. However, the probability that a data pattern will be much less than the distance dH$_{min}$ away from the sync pattern is much greater.

Because it is not possible to guarantee that the data pattern will have at least a predetermined dH over all shifts, it is reasonable to select from the sync field patterns in Table 3 those which are not acceptable patterns in 8/9(0,4,4) encoding or in general m/n(d,k,i) encoding. This is another screen to reduce the number of patterns or a secondary screen. Further, as few n-bit sub-sequences of the sync pattern as possible should be valid code words, this will improve the probability that dH is not 0 in any region except R$_4$ 704.

The 18-bit sync patterns in Table 3 which are made up of two concatenated 9-bit bytes that are not acceptable code words are numbers 2 and 3. Further, of the ten possible sequential 9-bit bytes in sync pattern 2, only five of them are valid code words. Similarly, only four 9-bit sub-patterns in number 3 are valid codewords; six in number 4. Sync pattern number 1 violates the constraint that there can be no more than four consecutive zeros. This run of zeros provides fewer PLL updates than is desirable. At this point, sync patterns 2 and 3 are the surviving candidate patterns that may be valid. None of the 9-bit sync patterns in Table 3 is a valid code word. None violates the run-length constraint on zeros. Therefore, they all are surviving possible sync patterns for a 9-bit implementation.

At this point, any of the surviving patterns should yield similar performance. However, additional screens can be considered in order to limit the choice. These are the tertiary screens. One such screen acknowledges that transitions on the disk which are spaced most closely together may experience non-linear shifts in their position. This is typically compensated for by pre-compensating the write current waveform in such a way as to position the closest transitions farther apart. All things being equal, a sync field pattern which is not so magnetically challenging is preferred because the pre-compensation process may not be perfect in all cases. This serves to slightly improve SNR by removing this source of non-linear transition shift. This could be a more important screen, however, the Hamming distance screen typically passes patterns which include the minimum transition spacing.

This aspect may be determined by pre-coding the surviving candidate sync patterns with the 1/(1⊕D²) function for the PR4 system example. The results of this operation are included in Table 3 for the survivors of the sync patterns. The pre-coding assumed that the previous two pre-coded bits were 00. This implies that the preamble is made up of an integer multiple of the 1111 pattern, for example, the sequence 1111 1111 . . . pre-codes to: (00) 1100 1100 . . . Each new (pre-coded) sequence then NRZ (Non-return-to-zero) modulates the write current waveform. This means that 0s are negative values of write current and 1s are positive values. The transitions on the magnetic media correspond to changes in write current from positive to negative and vice versa. For example, sub-sequences of 010 or 101 correspond to the closest magnetic transition spacing. Unfortunately, all of the surviving candidate sync patterns in these examples have this challenging magnetic transition spacing, so this is not a useful screen for N=9 or 18.

Other tertiary screens are possible with the present invention. Such as selecting that pattern which has the largest sum of dH for all shifts over the regions R$_1$ to R$_3$ (701 to 703). The sums are listed in Table 4. N shifts into R$_1$ 701 are included in the sum to reflect the increased ability of codewords with a higher number of zeros to reject the all 1s preamble, relative to codewords with fewer zeros. In all cases, of course, the number of zeros must be at least dH$_{min}$.

An additional consideration for sync field patterns as they shift into data, $R_s$ 705, is that their beginning is the opposite of their end for as many bits as possible, i.e. they are as anti-symetric as possible.

TABLE 4

Sum of dH over all shifts for surviving candidate sync field patterns.

| N | | Pattern | After Pre-coder ($1/(1 \oplus D^2)$) | $\Sigma$dH |
|---|---|---|---|---|
| 9 | 1 | 000010110 | 000010010 | 108 |
|   | 4 | 000101001 | 000100001 | 110 |
|   | 5 | 000101101 | 000100100 | 101 |
| 18 | 2 | 000011001001010111 | 000011110100010011 | 378 |
|    | 3 | 000100010110100111 | 000101000111010011 | 379 |

Figure 17:
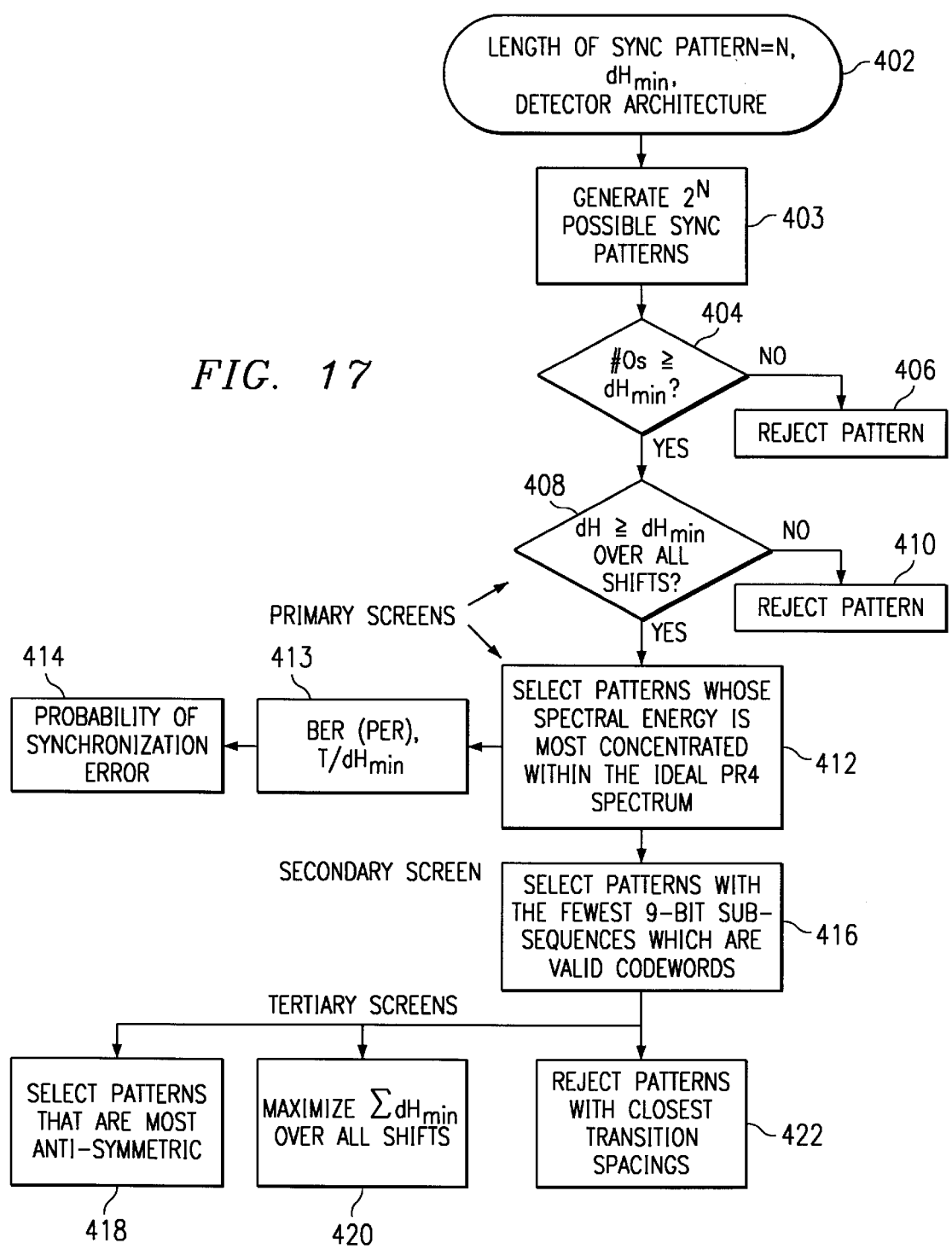
FIG. 17 illustrates a flow chart of the present invention.

FIG. 17 summarizes the possible screens in a flow diagram. As illustrated in FIG. 17, the operation of the present invention is illustrated. In block 402, for a particular sync detector architecture, the length of the sync pattern is set equal to N and $dH_{min}$, the minimum Hamming distance, is set. In block 403, the total number ($2^N$) of sync patterns are generated. Note, large number of patterns may be shipped (not generated), for example, patterns that begin with less than $dH_{min}$ zeros.

In decision block 404, it is determined if the number of zeros in the pattern is greater than or equal to the numeric Hamming distance. If no, the sync pattern is rejected in block 406.

In block 408, the minimum Hamming distance is determined over all shifts of the read pattern starting with the beginning of the preamble and shifting to the sync pattern. In block 410, the pattern is rejected if the minimum Hamming distance is not maintained. This completes the first primary screen.

In block 412, using the second primary screen, the patterns whose spectral energy is most concentrated within a predetermined PR4, for example, spectrum is determined. In block 413, the BER (PER), T and $dH_{min}$ are determined. T may be adjusted to reflect the expected position of the sync field in the sync detection interval. For example, if the sync field is toward the end of the sync detection interval, T should be adjusted low to decrease $P(D_1|H_0)$. In block 414, the probability of a synchronization error may be determined.

In block 416, the secondary screens are applied to select patterns with the fewest 9-bit sub-sequences which are valid code words. The valid code words have been predetermined. Patterns that are not valid code words or which have the fewest n-bit sub sequences which are not valid code words are preferred. In block 418, 420 and 422 the tertiary screens are applied. In block 418, the patterns that are most anti-symmetric are selected. The remainder is rejected. In block 420, the maximum $\Sigma$ $dH_{min}$ is determined over all shifts. In block 422, the patterns with closest transaction spacings are rejected FIG. 17 shows that the tertiary screens are applied in parallel, however, these may be applied in series, although the specific sequence may be in any order.

All such screens considered, for the surviving candidate patterns in Table 3. It may be argued that the 9-bit pattern 5 and 18-bit pattern 2 are preferred. Pattern 5 may be slightly preferable because it maintains a higher Hamming distance over a longer period than 1 and 4 as it shifts over itself into the data field. Alternatively, Pattern 2 may be slightly preferable because of its concentration of spectral energy around $1/4T_s$.

Figure 18A:
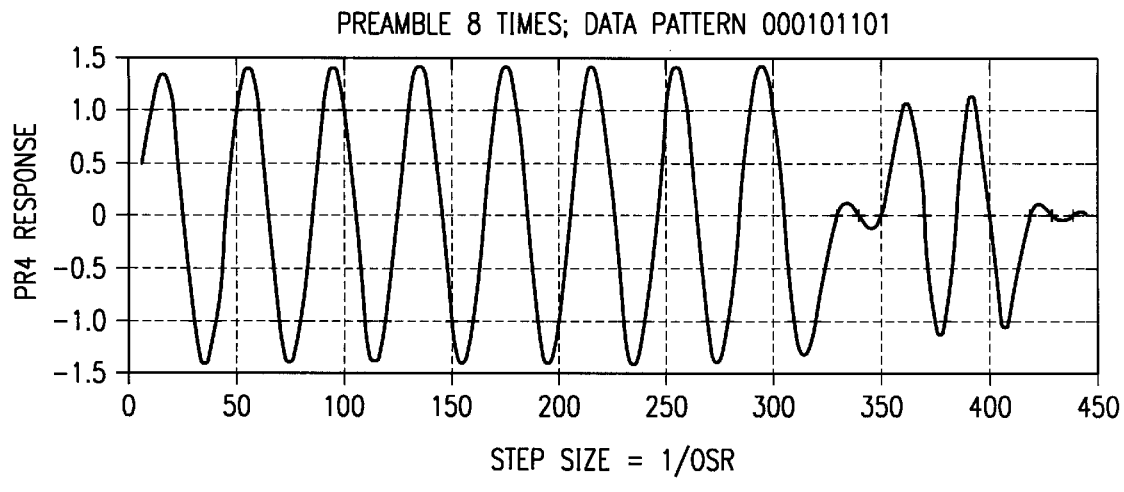
FIG. 18 illustrates equalized, minimum bandwidth, read back signal for two surviving N=9 bit sync patterns.
Figure 18B:
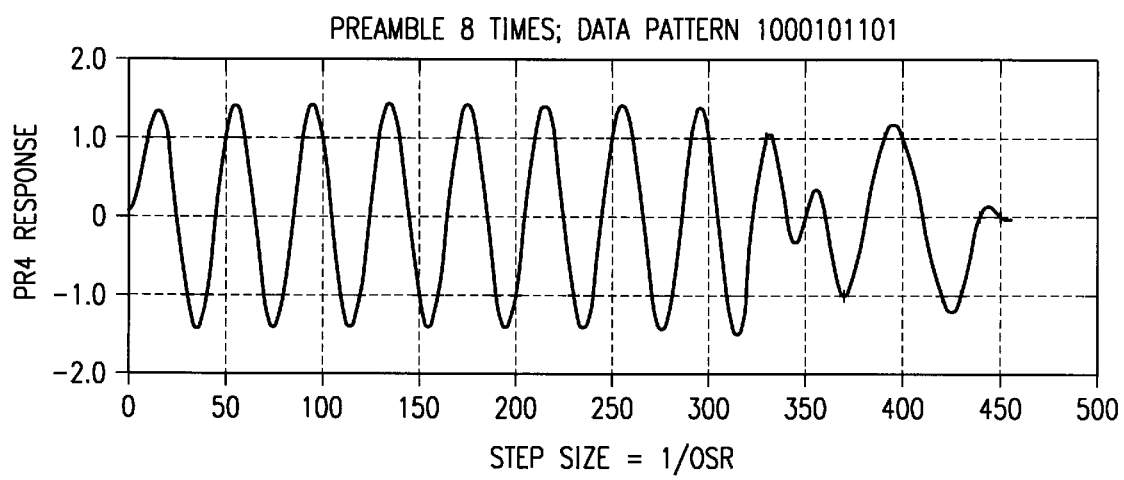
Figure 19A:
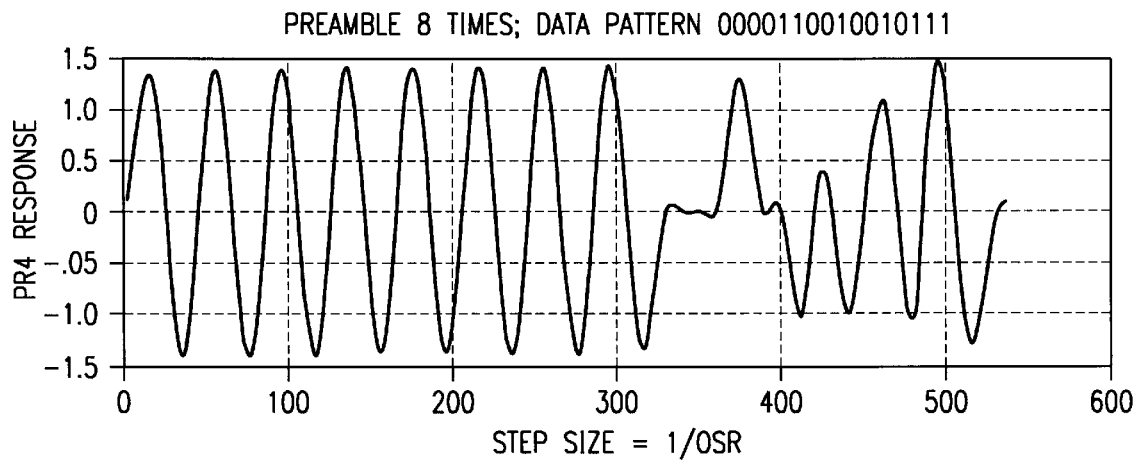
FIG. 19 illustrates the minimum bandwidth, read back signal for the surviving N=18 bit sync pattern; and, the effect on the Read Back Signal of an extra one in the preamble
Figure 19B:
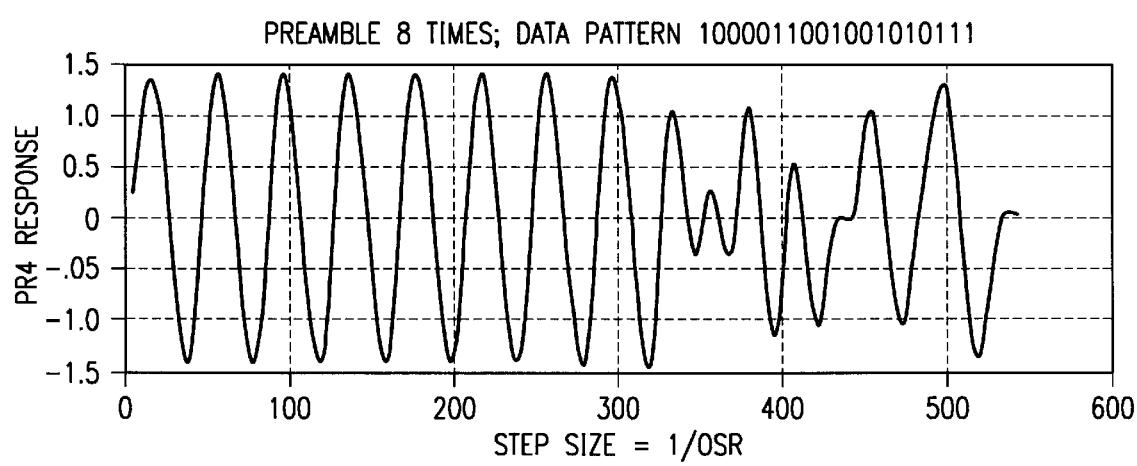
Figure 20:
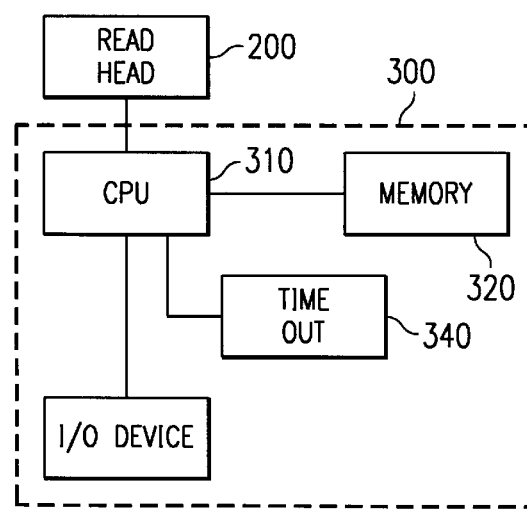
FIG. 20 illustrates a circuit diagram of the present invention.

As an additional consideration, FIGS. 18 and 19 show the expected read back waveform for the selected 9- and 18-bit sync patterns. This uses equalized transition responses (sinc functions). The difference in the read back waveforms caused by an even or odd number of 1s in the preamble is a condition. In order to eliminate this condition, that the 0's of a sync pattern are caused by the tightest transition spacings, the preamble can be constrained to always be an even number of 9-bit bytes of 1's.

FIG. 18 illustrates equalized, minimum bandwidth, read back signal for the surviving N=9 bit sync pattern. The effect of ending the preamble with an odd or even number of 0's is illustrated.

FIG. 19 illustrates equalized, minimum bandwidth, read back signal for the surviving N=18 bit sync pattern. The effect of ending the preamble with an odd or even number of 0's is illustrated.

Using the algorithms described in the preceding section and the methods for determining threshold based on Hamming distance, the operating conditions listed in Table 5 achieve good results. The approximate probability of error reflects the observation that errors from a PR4 Viterbi algorithm occur in independent pairs, with equal probability of being of length 2 or 3. Note, one implementation may write the sync pattern stored in its on-chip registers when the first non-zero bit is sent to its NRZ port. This implies that the input sequence from the controller will not be exactly the sync pattern, because all of the candidate sync patterns begin with zeros. Further, note that the sync pattern written to the disk is typically write pre-compensated.

Table 5. Recommended Sync Field Patterns and Thresholds for PR4 systems using N=9 & N=18 bit sync field patterns. Approximate probabilities of error are based on Table 1, using PER≡BER/2=$10^{-5}$ at an SNR of 13 dB.

TABLE 5

| Sync Field Detector | Threshold | Sync Field Pattern | $dH_{min}$ | Approximate Probability of Error |
|---|---|---|---|---|
| 9 single-bit comparisons | 2 bits | 000101101 | 5 | $10^{-10}$ |

TABLE 5-continued

| Sync Field Detector | Threshold | Sync Field Pattern | $dH_{min}$ | Approximate Probability of Error |
|---|---|---|---|---|
| 18 single-bit comparisons | 5 bits | 000011001001010111 | 10 | $10^{-15}$ |
| 63-bit blocks | 3 blocks | 000011001001010111 | 10 | $0.25*10^{-10}$ |

The following Appendix is code for one implementation of the present invention.

Other Embodiments

Although the present invention and its advantages have been described in detail, it should be understood that various changes, substitutions and alterations can be made herein without departing from the spirit and scope of the invention as defined by the appended claims.

I claim:

1. A device for providing byte synchronization with a data stream by detecting a sync pattern where the data stream includes a preamble section followed by a sync pattern followed by a data section, comprising:

a reading device for reading a sample pattern of bits of said data stream;

a testing device for testing said sample pattern to determine a byte synchronization condition to identify the first bit of data in said data section, wherein said testing device determines byte synchronization by finding a correlation between said sync pattern and said sample pattern based on a predetermined criteria; and wherein said sync pattern has a minimum hamming distance over shifts of itself, a minimum hamming distance over shifts of the sync pattern and the data pattern used in the preamble section; and an output device to provide a signal to indicate detection of said byte synchronization condition.

2. A device for providing byte synchronization as in claim 1, wherein said sync pattern is a valid codeword for data in said data section.

3. A device for providing byte synchronization as in claim 1, wherein said sync pattern has spectral energy most concentrated within the ideal spectrum of the system.

4. A device for providing byte synchronization as in claim 1, wherein said sync pattern is additionally based on a pattern that is most anti-symmetric.

5. A device for providing byte synchronization as in claim 1, wherein said sync pattern lacks close transition spacing.

6. A device for providing byte synchronization with a data stream by detecting a sync pattern where the data stream includes a preamble section followed by a sync pattern followed by a data section, comprising:

a reading device for reading a sample pattern of bits of said data stream;

a testing device for testing said sample pattern to determine a byte synchronization condition to identify the first bit of data in said data section, wherein said testing device determines byte synchronization by finding a correlation between said sync pattern and said sample pattern based on a predetermined criteria; and wherein said sync pattern has a minimum hamming distance over shifts of itself, a minimum hamming distance over shifts of the sync pattern and the data pattern used in the preamble section and wherein said sync pattern is a valid codeword for data in said data section; and an output device to provide a signal to indicate detection of said byte synchronization condition.

7. A device for providing byte synchronization as in claim 3, wherein said sync pattern has spectral energy most concentrated within the ideal spectrum of the system.

8. A device for providing byte synchronization as in claim 3, wherein said sync pattern is additionally based on a pattern that is most anti-symmetric, meaning the valid pattern maintains a minimum hamming distance from itself as it shifts past an exact copy of itself into unknown user data in said data stream.

9. A device for providing byte synchronization as in claim 3, wherein said sync pattern lacks close transition spacing.

* * * * *